F. L. O. WADSWORTH.
MANUFACTURE OF GLASS SHEETS.
APPLICATION FILED APR. 13, 1909.

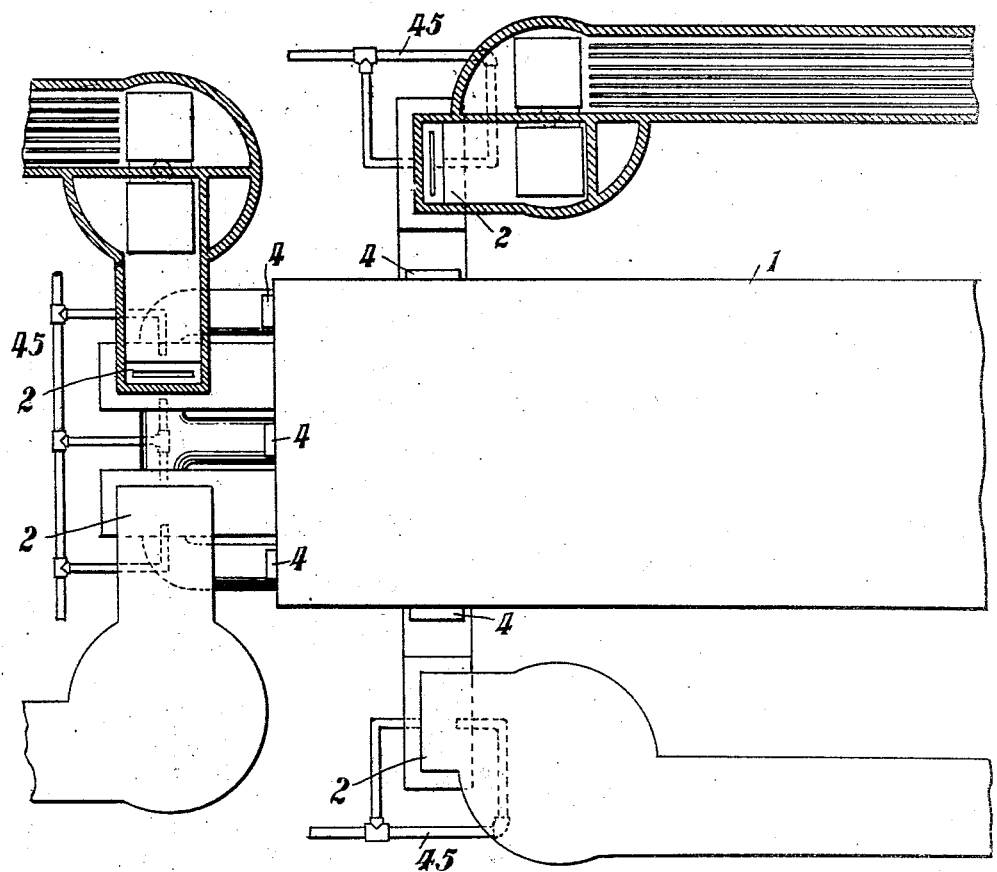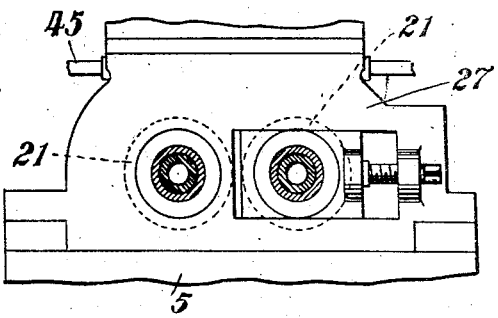

1,161,912.

Patented Nov. 30, 1915.
3 SHEETS—SHEET 2.

F. L. O. WADSWORTH.
MANUFACTURE OF GLASS SHEETS.
APPLICATION FILED APR. 13, 1909.
1,161,912.
Patented Nov. 30, 1915.
3 SHEETS—SHEET 3.
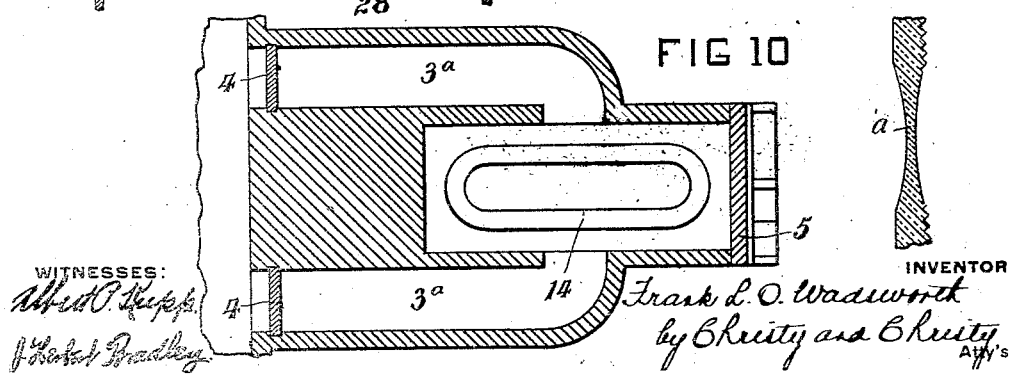

UNITED STATES PATENT OFFICE.

FRANK L. O. WADSWORTH, OF SEWICKLEY, PENNSYLVANIA.

MANUFACTURE OF GLASS SHEETS.

1,161,912.  Specification of Letters Patent.  Patented Nov. 30, 1915.

Application filed April 13, 1909. Serial No. 489,571.

*To all whom it may concern:*

Be it known that I, FRANK L. O. WADSWORTH, residing at Sewickley, in the county of Allegheny and State of Pennsylvania, a citizen of the United States, have invented or discovered certain new and useful Improvements in the Manufacture of Glass Sheets, of which improvements the following is a specification.

The invention described herein relates to certain improvements in apparatus for drawing glass sheets and has for its object a combination of parts or elements whereby the glass is caused to move continuously from a suitable receptacle.

It is a further object of the invention to provide for the formation of figures or patterns on the surfaces of the sheet during its formation.

The invention is hereinafter more fully described and claimed.

Figure 2:
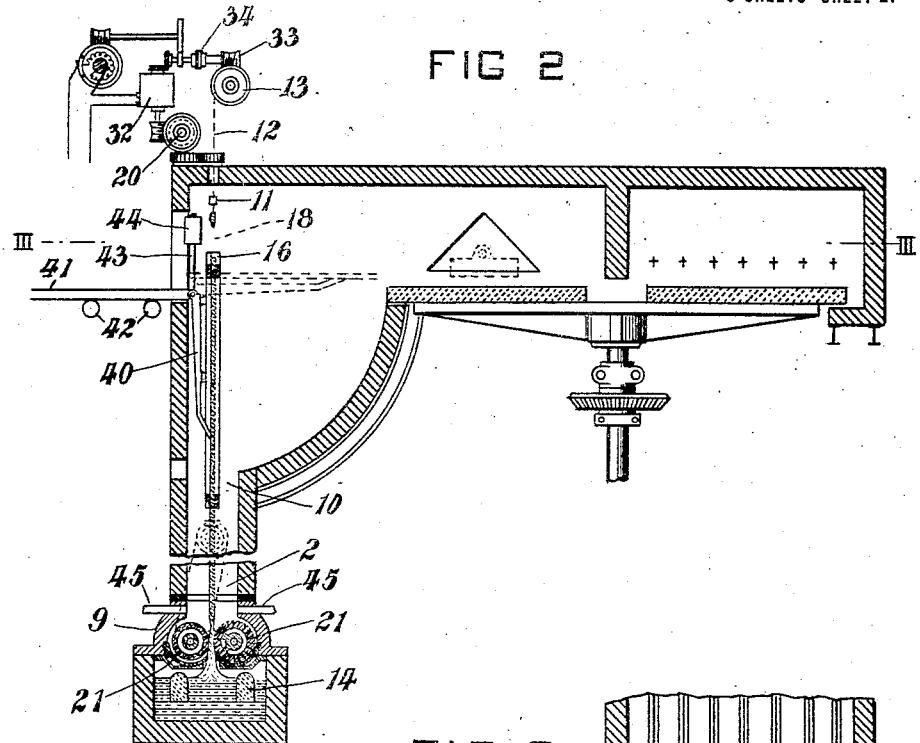
Figure 3:
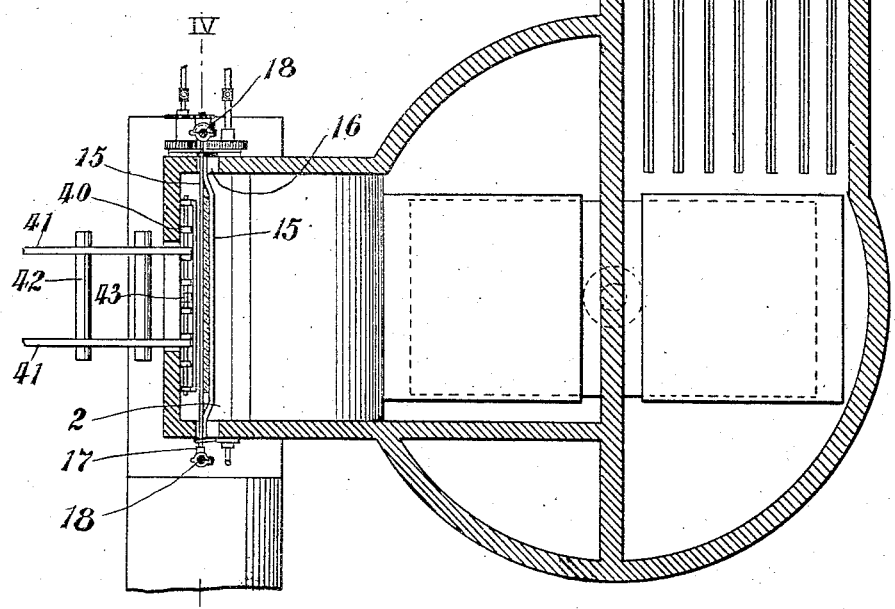

In the accompanying drawings forming a part of this specification, Figure 1 is a plan view partly in section, showing a tank furnace provided with a plurality of forehearth chambers or receptacles, from each of which glass may be drawn continuously in sheet form; Fig 2 is a sectional elevation showing drawing and flattening apparatus in connection with one of the forehearth chambers; Fig. 3 is a sectional plan view on a plane indicated by the line III—III Fig. 2; Fig. 4 is an enlarged sectional view on a plane indicated by the line IV—IV Fig. 3; Fig. 5 is a sectional elevation on a plane indicated by the line V—V Fig. 4; Figs. 6, 7 and 8 are sectional detail views illustrating the construction of the clamps and the manner of connecting them to the drawing mechanism; Fig. 9 is a detail view illustrating a modification of the heaters carried by the shields; Fig. 10 is a sectional plan showing a modification in the manner of connecting the drawing chamber to the tank; Fig. 11 is a detail showing a modification in the manner of mounting the rolls; and Fig. 12 is a detail view showing a portion of the sheet reduced in thickness for dividing it into sections.

In the practice of my invention the tank furnace 1 is provided with a plurality of forehearths in which are formed drawing chambers 2, from which the glass is drawn by the apparatus hereinafter described. The drawing chamber is so located, *i. e.* with its length at right angles to the wall of the furnace, that the sheet may be drawn with its edge presented to such side wall, so as to avoid irregularities of heating due to the radiation of heat from the wall of the furnace. This drawing chamber may be connected to the tank by a single channel 3 as shown in Fig. 4, or preferably by two channels 3$^a$ as shown in Fig. 10. By the use of two channels delivering the glass through opposite side-walls of the drawing receptacle, uniformity in condition of the glass on opposite sides of the chamber is attained; while by means of the ring 14 projecting a suitable distance below the surface of the glass, the highly heated glass flowing into the receptacle is separated from that portion at the surface of and immediately beneath the point of drawing, which portion, as is well known, should be somewhat cooler. In either construction the flow of glass to the drawing chamber is regulated by a gate or valve 4. The end wall 5 of the drawing chamber is made removable as shown in Fig. 4, so as to permit of the draining of the glass when desired from this chamber and the channel connecting it with the tank. In the construction shown this end wall is hinged as at 6 to the bottom of the drawing chamber and is held in closed position by any suitable means as by a brace 7. In order to heat the glass flowing to the drawing chamber if necessary, and also to enable the melting out of the glass from the drawing chamber and channel 3, suitable burners 8 are provided as shown in Fig. 4. The drawing chamber is covered by an arched casting 9 which serves as a support for the drawing shaft 10, into which the glass is drawn as hereinafter described. The movement of the glass at the beginning of the drawing operation is effected by means of a bait 11 which is connected to a cable 12 wound on a drum 13 driven by suitable means as hereinafter described, whereby the bait may be drawn up after it has been lowered into the glass contained in the ring 14, to initiate the operation. After a sufficient length of glass has been pulled up by the bait, clamps are applied thereto, such clamps being of any form or construction, such for example as that shown in Fig. 6, and consisting of two bars 15 passed through slots 16 in the side walls of the shaft and secured firmly against the glass by rings or other suitable holding devices. One of these bars is made longer than the other and has its ends mounted in sockets in blocks 17, which have their outer ends grooved to receive the threaded shafts 18. Half nuts 19 are hinged to the blocks so that they can be swung into and out of engagement with the shafts. These threaded shafts are operated by shaft 20 through bevel gears as shown, the shaft being driven as hereinafter described.

In order to provide for continuous drawing of the sheet two clamps as above described are employed, which may be termed for convenience the main clamp and the auxiliary clamp. The auxiliary clamp is secured to the sheet of glass which has been drawn up by the bait, at a line somewhat below the desired line of severance. The portion of the sheet above is then cut off by any suitable means, as shears or a diamond, and the severed section is also detached from the bait and carried away as hereinafter described, while the bait is then drawn up out of the way. The main clamp is then applied to the sheet in process of formation at a line above the auxiliary clamp. The auxiliary clamp is then disconnected from the sheet and from the lifting screws. When a sufficient length has been drawn, the auxiliary clamp is again applied to the sheet below the line of severance and connected to the screws, so that both clamps will thereafter move in unison. After the auxiliary clamp is applied, the sheet is severed and the section removed as hereinafter described, the main or upper clamp being disconnected from the section, and lowered to be again applied to the sheet being formed. In order to permit the clamps being removed, the sockets in the blocks 17 have their upper walls cut away as shown in Figs. 7 and 8 so that the clamping bar can be lifted and drawn longitudinally from the drawing shaft.

The glass in the formation of the sheet, is drawn up between rolls 21, journaled in the end walls of the casting 9 and geared together so as to be driven simultaneously. One of these rolls is positively driven by one of the shafts 18 through suitable bevel gearing as shown. These rolls may be made smooth if desired, or one or both of them may have formed on their surface figures or patterns, which it is desired to impress or form on the surfaces of the sheet. These rolls are preferably made hollow and a cooling medium is introduced through hollow journals and escapes through the opposite hollow journal. In order to prevent injury to the glass from contact with the metal surface provision may be made for introducing fluid between the glass and the surfaces of the rolls. As shown at the right hand side of Fig. 5, this can be done conveniently by mounting the roll loosely on the hollow shaft 23, extending through the roll and provided inside the latter with wings 24 bearing at their ends against the inner surface of the roll. These wings together with the inner surface of the roll form a chamber, into which fluid introduced through the hollow shaft will flow through perforations 23. This chamber is located directly opposite the point of contact of the roll with the glass and through the roll wall are formed perforations for the passage of the fluid to the surface of the roll, when the perforations are in line with such chamber. It is preferred to employ steam or water which will become vaporized immediately on contact with the glass, thus forming a fluid film between the glass and the roll. In order to protect the rolls from the heat of the glass in the drawing chamber, removable shields 26, preferably formed of cast iron and made hollow for the circulation of a cooling medium, are supported upon the casting 9, being removable longitudinally as also are the rolls, the end wall 27 of the casting 9 being made removable as shown in Fig. 11 for the purpose of removing the shields and rolls. In order to protect the glass from the chilling effect of the shields means are provided for heating the surfaces of the glass as it moves up from the bath. In Fig. 5 the shields are provided with gas conducting passages 28 extending along near the inner edges of the shields, the gas escaping through perforations to direct the flame against the sides of the glass as it is being drawn from the drawing chamber or pot. In lieu of this construction I may employ an electric heater as shown in Fig. 9 consisting of wires 30 embedded in an asbestos block 31 secured to the inner edges of the shield 26.

The drum 13 and also the shaft 20 are driven by a suitable motor preferably an electric motor 32, worm gearings being employed for transmitting motion from the armature shaft to the drum shaft and the shaft 20. The worm gearing 33 for driving the drum 13 is connected through a clutch mechanism 34 to the motor shaft so that it may be put out of operation after the continuous drawing mechanism has been put into operation as heretofore described.

Provision is made for the transfer of the sections after being severed to a carrier by which such sections can be transferred to an annealing lear. This carrier may be made in the form of a flattening wheel on which any irregularities of the sheets can be eliminated in a manner well known in the art. In order to transfer the sections onto this carrier I provide a series of fingers 40 pivotally connected to bars 41 mounted on rollers 42, which are so arranged that when the fingers are turned up to or approximately to horizontal position any section resting thereon would be slightly above the surface of the carrier. These fingers normally hang down in the drawing shaft parallel with the path of movement of the glass. In order to turn them an arm 43 is secured to the shaft of these fingers and is provided with a counterweight 44 to assist in the turning and to hold the fingers and sheet in horizontal position. After a section has been severed as described, the operator pulls on this weighted lever, turning the section up to a horizontal position. The bars and fingers which carry the section are moved in to deposit the section on the transfer device when the said parts are drawn back and the fingers turned down to normal position.

As hereinbefore stated, the drawing chambers and the clamps for the glass to be drawn are so arranged with reference to the tank furnace that the narrowest portion of the sheet, i. e., the edge, is presented to the heat radiated from such furnace, so that the radiating heat will pass along the sides of the sheet equally heating them, thus preventing any distortion. The drawing shaft is employed to protect the sheet during the formation, from any drafts which would tend to suddenly chill any portion of the sheet, thereby causing a cracking of the same.

As shown in the drawings, the shaft or chamber into which the sheet is drawn is connected by pipes 45 to a suitable exhaust apparatus. These pipes are connected to the shaft or chamber closely adjacent to the point of formation of the sheet, and will cause the air heated by radiation from the glass to flow down in opposition to the direction of movement of the sheet and thus draw the heat away from the finished sheet and the clamps.

I claim herein as my invention:

1. In an apparatus for drawing sheet glass, the combination of a pot or receptacle for the glass to be drawn, a drawing mechanism, positively driven rolls arranged respectively on opposite sides of the plane of movement of the sheets and in such proximity to the receptacle that the glass will be plastic when engaged by the rolls, and shields arranged between the rolls and the glass in the pot and above and out of contact with the glass.

2. In an apparatus for drawing glass sheets, the combination of a receptacle for the glass, a shaft or chamber arranged to receive the sheet as formed, means for drawing the glass from the receptacle into the chamber, and means for causing the heat in said chamber to flow in opposition to the direction of movement of the sheet toward the point of formation of the sheet.

In testimony whereof, I have hereunto set my hand.

FRANK L. O. WADSWORTH.

Witnesses:
 CHARLES BARNETT,
 FRANCIS J. TOMASSON.